Sept. 18, 1956  C. J. PLANK ET AL  2,763,622
CRACKING CATALYST PREPARATION
Filed July 10, 1951
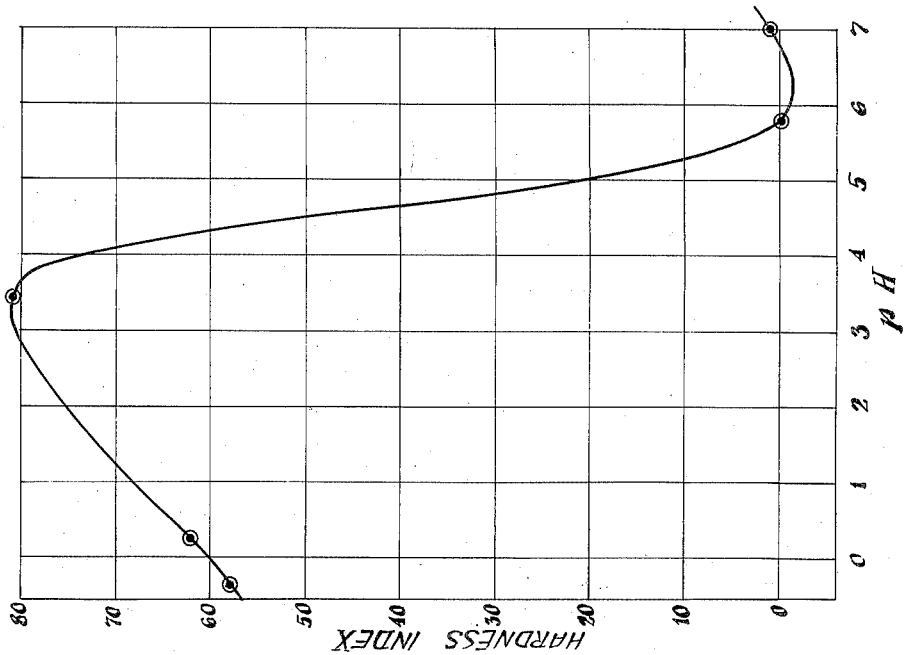
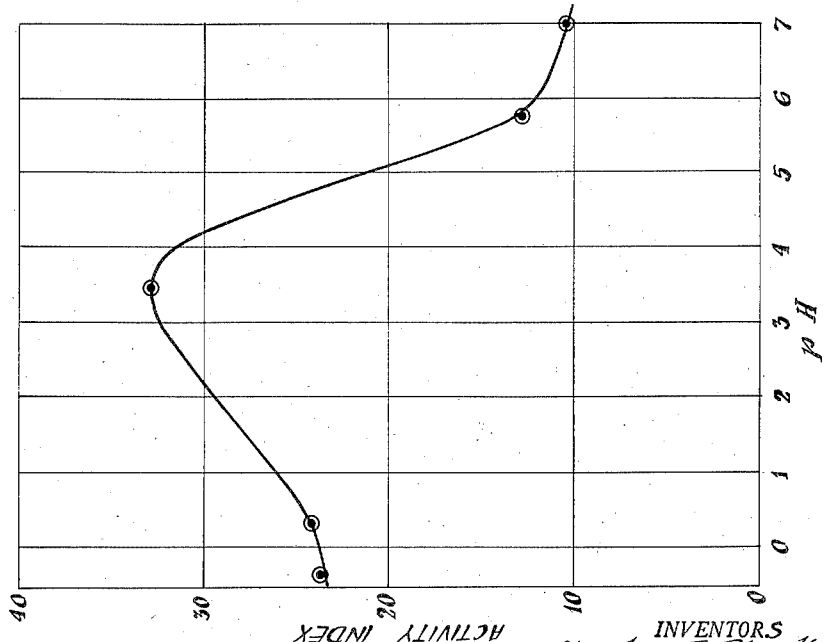
INVENTORS
Charles J. Plank
BY Peter D. Branton
Raymond W. Barclay
ATTORNEY

United States Patent Office 2,763,622
Patented Sept. 18, 1956

2,763,622

CRACKING CATALYST PREPARATION

Charles J. Plank and Peter D. Branton, Woodbury, N. J., assignors to Socony Mobil Oil Company, Inc., a corporation of New York Application July 10, 1951, Serial No. 235,938

6 Claims. (Cl. 252—451)

This invention relates to a method for the manufacture of porous adsorptive catalytic materials useful in promoting hydrocarbon conversion and to a process for catalytic conversion of hydrocarbons. More particularly, the present invention is concerned with the preparation of an improved cracking catalyst and with processes utilizing the same in which hydrocarbons of lower boiling point and lower molecular weight are produced from heavier petroleum oils of higher boiling point.

While many materials of various composition have heretofore been suggested for use as cracking catalysts, those generally employed in commercial operation comprise composites of silica and alumina. Thus, adsorbent contact masses comprising gels of silica and alumina in intimate association produced by synthetic methods involving gelation or cogelation of these materials have been widely employed as hydrocarbon conversion catalysts.

In addition to synthetic gel type composites, a number of naturally occurring clays comprising aluminum hydrosilicate, for the most part, have been suggested for use as cracking catalysts. Of the numerous available clays, only some of the bentonite clays belonging to the montmorillonite group and activated by previous acid treatment have been found to be of sufficiently high level of activity to merit consideration in commercial operation. Raw kaolin clays, when attempted to be used as catalysts in cracking of hydrocarbons have not demonstrated acceptable commercial results since there were obtained only poor yields in quantity and quality of cracked products such as gasoline, and comparatively excessive amounts of carbonaceous deposits were formed. Moreover, acid treatment of raw kaolin clays, such as has been employed in activating the aforementioned bentonite clays is ineffective in raising the catalytic activity thereof to a desired commercially attractive level.

Previous attempts to activate kaolin clays for use as catalysts in promoting hydrocarbon conversion have generally involved a preliminary thermal treatment of the clay at certain elevated temperatures designed to render the clay susceptible to activation by altering its phase structure, followed by an acid leaching in order to extract part of its alumina and increase its surface area, and also to bring its alumina to silica ratio within optimum limits. This activating treatment has sometimes been supplemented during the preliminary heating stage by the addition of a gaseous reactant designed to reduce the iron content of the clay by rendering the same more susceptible to removal during subsequent acid leaching. The acid treatment in every case removes a portion of the aluminum content of the clay. On repeated or more drastic treatment with acids, the products so obtained are increasingly impaired in regard to mechanical stability. In addition, because of accompanying extraction of comparatively large quantities of aluminum compounds, the treatment effects a marked decline in catalytic activity, eventually resulting in products of such reduced catalytic activity that they are no longer useful for their intended purpose. Moreover, procedures entailing the steps of preliminary thermal treatment followed by acid leaching are wasteful since the yield of catalytic material in such instances seldom exceeds 60 to 80 per cent by weight of the original clay.

It is an object of this invention to provide an improved catalytic process for hydrocarbon conversion utilizing a stable catalyst prepared from kaolin. A further object of this invention is the provision of a process for manufacturing a cracking catalyst wherein kaolin clay is employed without encountering the disadvantages inherent in the procedures of the prior art. A still further object is the provision of a method for preparation of a commercially attractive catalyst.

The above and other objects which will be apparent to those skilled in the art are achieved in accordance with the present invention. Broadly, the process of this invention involves intimately admixing raw kaolin clay with silica hydrogel prepared under particularly defined conditions of pH control. The method described herein eliminates both the step of thermally pretreating and the step of acid leaching heretofore considered essential in activation of kaolin clays for use as hydrocarbon conversion catalysts. By the present process, raw kaolin, that is, kaolin still maintaining its original phase structure, in intimate admixture with silica gel, has been found to be an efficient cracking catalyst and to provide desirable performance characteristics in the cracking of heavy petroleum hydrocarbons to lighter materials boiling in the range of gasoline. Hydrocarbon conversion processes employing the present catalyst have important advantages distinguishing the same over commercial catalysts in current use derived from acid activatable bentonite clays or from wholly synthetic composites of silica-alumina gel.

Among the advantages demonstrated by the catalysts employed in accordance with the present invention are a high mechanical stability and low initial coke make in the cracking of heavy petroleum stocks. The ratios of gasoline/coke of various charge stocks may be substantially improved with the present catalyst and, in fact, the present catalyst, particularly after undergoing a mild acid treatment as hereinafter described, demonstrated surprisingly better gasoline/coke ratios than commercially synthetic catalysts. The catalysts described herein are also capable of withstanding severe conditions and higher regeneration temperatures in practical operation which, considered together with an indicated useful life of the catalyst and significant yields of desired cracked products, constitute important economic advantages in addition to that advantage afforded by the use of a readily available and inexpensive raw material.

It has thus been found, by intimately admixing raw kaolin clay with silica hydrogel prepared under particularly defined conditions, that important improvements, particularly in regard to the hardness and catalytic properties of the resulting composite, are obtained. Preliminary thermal treatment and acid leaching heretofore deemed essential in activation of kaolin may be dispensed with in accordance with the instant preparation process. The catalysts prepared by the present method, moreover, exhibit a high initial hardness and an improved selectivity in the cracking of petroleum hydrocarbons, particularly as measured in terms of the ratio of the quantity of gasoline produced from cracking of a hydrocarbon oil to the quantity of coke deposited. In addition, the activity of the raw kaolin-silica gel catalyst of the present invention is retained over an extended period of use.

In practice of the invention, raw kaolin clay in either ground, naturally occurring or artificially formed physical shape is intimately admixed with silica hydrogel. For such admixture, room temperatures may be conveniently employed up to about 110° F. The mixing of raw kaolin and silica hydrogel may be brought about by any feasible means to afford an active cracking catalyst, providing the two materials are thoroughly intermixed and providing the pH of the silica hydrogel during the gelation is maintained below a pH of 4 and preferably at a pH between 1 and 4, and particularly in the range of 2 to 4. It has been found, as will be apparent from data presented hereinafter, that silica hydrogel prepared at a pH above 4, when mixed with raw kaolin, does not yield the effective cracking catalyst provided by the procedure of the present invention. It is contemplated that the mixing of the raw kaolin and silica hydrogel may be achieved by any of a variety of procedures permitting an intimate degree of interdispersion of components. Thus, the mixing of the raw kaolin and silica hydrogel may be brought about by milling the two components together until thorough admixture thereof has been attained; or the mixing may be accomplished by cogelation techniques, that is, by dispersing finely divided raw kaolin in a silica hydrosol with subsequent gelation of said hydrosol; or finely divided raw kaolin may be added to one of the reactant solutions from which the silica hydrosol is prepared, followed by hydrosol preparation and gelation; or, alternatively, the raw kaolin may be digested with an alkali metal silicate at a moderately elevated temperature, followed by gelation of the digested mixture. In those methods wherein the raw kaolin is dispersed in a silica hydrosol or reactant used in preparation of said hydrosol, the kaolin is preferably in powder form, that is, the particle size thereof is preferably less than about 75 microns.

The ratio of raw kaolin to silica hydrogel employed in the present process is such as to adjust the weight ratio of $SiO_2$ to $Al_2O_3$ in the final product to the approximate range of 2.5:1 to 10:1. For a given pH of silica hydrogel preparation within the aforegoing critical limits, it is preferred to avoid the use of an excessive quantity of kaolin. Usually, the catalyst described herein will contain on a dry basis from about 10 up to about 50% by weight of kaolin and, more particularly, between about 20% and about 50% of kaolin.

The composite of raw kaolin and silica hydrogel obtained in accordance with any of the methods above described may be made into a catalyst or other contact mass and finished in any known or desired manner which may include, in any order of sequence, washing, base-exchanging, drying, and forming into desired shapes and sizes. For catalyst use, the composite should be finally calcined at a temperature above 500° F. in air or steam or in mixtures of the same, although, if desired, the calcination step may be effected in the use of the catalyst incident to the high temperatures encountered in hydrocarbon conversion processes and regeneration of the catalyst.

Irregularly shaped masses or pieces of the composite contact mass may be formed by suitably breaking up a dry filter cake, or more regular sizes and shapes may be obtained by tableting, molding, casting, or extruding the wet or wetted comminuted material. In those cases wherein the raw kaolin in finely divided form is incorporated in a silica hydrosol, or reactant used in preparation of said hydrosol, the composite is desirably allowed to set as droplets to a hydrogel in a static or turbulent water-immiscible liquid to produce spheroidal contact particles of the "bead" type.

It has further been found that the composites described herein are susceptible to further improvement in regard to the catalytic properties thereof without loss of hardness by subjecting the composites to a mild acid treatment. Such acid treatment may be carried out at any time after hydrogel formation with either a mineral or an organic acid. It is necessary to moderate the acid treatment to the extent of retaining substantially the features of uniformity of treatment and physical strength with the conditions and extent of treatment so as to effect a substantial improvement in the activity of the resulting composite. This control is obtained by using relatively dilute acid such as 5 to 20% HCl or 5 to 25% $H_2SO_4$ or similarly acting acids. Acid treatment is preferably carried out at room temperatures or somewhat higher temperatures generally not exceeding 110° F. The quantity of diluted acid employed should be at least sufficient in volume to cover the composite undergoing treatment and be of sufficient strength to effect substantial improvement in the resulting activity of the treated composite. Aside from the above, quantity of total acid employed is not qualitatively important but it will be understood that from a commercial standpoint the use of larger quantities of acid and particularly more frequent changes of acid are beneficial since these will tend to accelerate the treating process. The period of acid treatment will usually extend over about 24 hours although acid treatment in a shorter time, such as 8 to 12 hours, affords substantial improvement of activity, with progressively improved activity as the duration of the treatment is increased up to and beyond 24 hours up to about 36 hours and, in some instances, up to about 72 hours or longer. A particularly convenient method of acid treatment is to continuously circulate a dilute aqueous solution of mineral acid through the composite undergoing treatment for a period of time sufficient to afford a substantial increase in catalytic activity of such composite. Following acid treatment, a catalyst should be water-washed to remove adhering acid, as well as water-soluble materials dissolved from the catalyst by the acid. Following washing, the catalyst may be dried in any convenient manner.

It has further been found that the effectiveness of the above described acid treatment is improved by preceding it with a steam treatment of the catalyst at a temperature in the range of 800° F. to 1500° F. As a general rule, steam treatment will be effected at a temperature within the range of about 1100 to about 1300° F. for at least about 2 hours at atmospheric pressure in 100% steam or in atmosphere consisting principally of steam but containing air or other gas substantially inert with respect to the composite being treated. As long as excessively high temperatures, causing rapid shrinkage or sintering of the composite, are avoided, longer periods of treatment than above designated apparently have no adverse effect. However, ordinarily it is not contemplated that the period of steam treatment will exceed about 24 hours.

In the use of the catalysts according to the present invention, no change in conditions of treatment of the hydrocarbon to be processed is rendered necessary. The usual conditions as to time, temperature, etc., can be followed if desired. As an example of a TCC operation, cracking may be carried out at a temperature of 850° F. to 950° F., employing a space rate (volume of charge, liquid basis, per volume of catalyst per hour) of about 1.5 and a pressure of about 10 pounds per square inch gauge. The temperature may broadly vary in the range of about 700° F. to about 1200° F., the space rate within the range of about 0.5 to about 10, and pressures may be employed from about atmospheric or slightly lower up to about 100 pounds per square inch or even higher. The ratio of catalyst to oil charge is generally within the range of 0.5 to 20 and preferably between about 1 and about 8. In processes other than TCC, such as fixed bed, the conditions employed may be such as to subject the oil to substantially equivalent conditions as those set out above in connection with the TCC process.

As a general rule, the active catalysts prepared by the process set forth hereinabove show desirable product distribution from the standpoint of lower molecular weight liquid hydrocarbons present in the gasoline fraction. While the octane rating of gasoline obtained is substantially equivalent to that obtained by the use of conventional synthetic silica-alumina catalysts, the olefin content of the gasoline is usually somewhat higher in the case of the present kaolin-silica gel catalyst. Because of the high heat stability of the present catalysts, the throughput of charge can be increased without introduction of damaging regeneration temperatures to obtain required burn-off of carbonaceous deposit in the cycle, since physical properties of the kaolin-silica gel catalyst lead to approximately even regeneration temperatures throughout the mass without undesired localized zone-burning.

The terms "kaolin" or "kaolin clay" as employed herein include those clays which in the raw state contain, as the principal clay material constituent present therein, kaolinite, halloysite, indianaite, dickite, nacrite, or anauxite. These minerals are all hydrous aluminum silicates in their uncalcined form and may be represented by the general formula:

$$Al_2O_3 \cdot 2SiO_2 \cdot nH_2O, \text{ n being generally 2}$$

The indicated formula gives a weight ratio of $SiO_2$ to $Al_2O_3$ of about 1.16, and the various naturally occurring clays utilized in the instant process generally have an $SiO_2$ to $Al_2O_3$ ratio of about 1.0 to about 1.5.

In the following examples, notations of catalytic activity are expressed in terms of the standard test (Cat–A method) described by Alexander and Shimp in National Petroleum News, Technical Section, August 2, 1944, at page R–537. In accordance with that method, a standard light East Texas gas oil is contacted with a catalyst at a temperature of approximately 800° F. under atmospheric pressure and at a liquid space rate of 1.5 (volume charge/volume of catalyst/per hour) for a ten-minute operation. The volume of gasoline of 410° F. cut point is measured and expressed as a percentage of the volume of oil charge, thereby designating the characteristic activity of a catalyst. The quantity of carbonaceous deposit formed on the catalyst is also measured and expressed in terms of weight per cent of charge. The weight per cent of gas and its specific gravity is also determined in this test.

EXAMPLE 1

McNamee clay from Bath County, S. C. was used in this example and had the following composition on a raw and anhydrous basis, respectively:

|  | Percent | |
| --- | --- | --- |
| $Al_2O_3$ | 41.7 | 48.5 |
| $SiO_2$ | 42.4 | 49.3 |
| $Fe_2O_3$ | 0.5 | 0.6 |
| $TiO_2, Na_2O$ | 1.4 | 1.6 |
| $H_2O$ | 14.0 | |

Two hundred sixty-five grams of the raw kaolin clay were dispersed in a solution of 1500 cc. of sodium silicate (0.151 gram $SiO_2$ and 0.048 gram $Na_2O$ per cc.) in 500 cc. of water at a temperature of about 5–10° C. Gelation was achieved by adding with continuous stirring a sufficient amount of 19N $H_2SO_4$ to attain a pH of about 0. The resulting product was then washed with water, dried at a temperature of about 280° F. and finally calcined at a temperature of 1050° F. to yield a composite containing approximately equal weight of kaolin and silica.

EXAMPLE 2

Two hundred sixty-five grams of the raw kaolin clay, such as used in Example 1, were dispersed by ball-milling in a silica hydrogel, which had been prepared at a pH of 0.3 by gelling 1500 cc. of a solution of sodium silicate (0.151 gram $SiO_2$ and 0.048 gram $Na_2O$ per cc.) in 500 cc. of water at a temperature of about 5 to 10° C. by the addition of a sufficient amount of 19N $H_2SO_4$. The resulting product was then washed with water, dried at a temperature of about 280° F. and calcined at a temperature of 1050° F.

EXAMPLE 3

Two hundred sixty-five grams of the raw kaolin clay described in Example 1 were dispersed in 1500 cc. of a solution of sodium silicate (0.151 gram of $SiO_2$ and 0.048 gram $Na_2O$ per cc.) in 500 cc. of water at a temperature of about 5 to 10° C., and a sufficient amount of 19N $H_2SO_4$ was added to achieve a pH of 3.5. The mixture was then allowed to gel, the proper agitation being achieved by placing the mixture in a ball-mill. The finished product was then washed with water, dried at a temperature of about 280° F. and calcined at a temperature of 1050° F.

The influence of pH of preparation on the activity and hardness of the present kaolin-silica gel cracking catalyst is apparent from the results achieved with the catalysts of Examples 1 to 5 set forth below. The catalysts of Examples 4 and 5 were prepared by the procedures of Examples 2 and 3, respectively, with the amount of sulphuric acid being adjusted so as to give the desired pH. The weight ratio of raw kaolin to silica (dry basis) was approximately 1:1 for each of the catalysts.

*Table 1*

| Example | pH | Hardness Index | Bulk Density | Cat–A Results | | | | |
| --- | --- | --- | --- | --- | --- | --- | --- | --- |
| | | | | Gas Gravity | Gas, Percent Wt. | Coke, Percent Wt. | 300 F. E. P. Gasoline, Percent Vol. | Activity Index |
| 1 | 0 | 58 | 0.73 | 1.19 | 3.6 | 2.0 | 18.3 | 23.9 |
| 2 | 0.3 | 62 | 0.67 | 1.23 | 3.2 | 1.4 | 16.2 | 24.0 |
| 3 | 3.5 | 81 | 0.80 | 1.32 | 5.2 | 2.0 | 23.6 | 32.9 |
| 4 | 5.8 | 0 | 0.47 | 1.11 | 1.4 | 0.6 | 6.5 | 12.9 |
| 5 | 7.0 | 1 | 0.43 | 1.03 | 1.0 | 0.4 | 4.3 | 10.3 |

The hardness index was determined by a standard test involving the subjecting of an 80 c. c. catalyst sample of particle size from 4000 to 6350 microns (#3 to #5 mesh), which had been previously tempered for 3 hours at 1050° F. in a dry air atmosphere, to a one-hour attrition (tumbling) with eight steel balls of $^{15}/_{16}$ of an inch of diameter, in a container rotating at 80 R. P. M. Under these conditions, the hardness index represented the proportion (in per cent weight) of residual catalyst of particle size greater than 3360 microns (#6 mesh).

The foregoing catalysts were calcined at about 1450° F. for 16 hours and upon testing showed substantially the same Cat–A results set forth above, indicating a high heat stability.

From the above table, it will be seen that the pH at which gelation is effected is an extremely important factor in influencing the activity and hardness characteristics of the resulting catalytic composite. A catalyst with an acceptable activity index may be prepared at a pH up to and including a pH of 4. Beyond that range, there is a distinctly sharp drop in activity, as will be evident from the results presented graphically in Figure 1 of the attached drawing.

Referring more particularly to Figure 1, where activity index of the catalyst is plotted against pH of preparation, it will be noted that there is a sharp downward break in the curve for activity at a pH greater than 4. It will further be seen that the most active catalysts are those prepared at a pH between 2 and 4, the optimum being a catalyst prepared at a pH of approximately 3.

Likewise, the effect of pH of preparation on the hardness characteristics of the resulting composite will be seen from the foregoing table. A catalyst with excellent hardness characteristics may be prepared at a pH up to and including a pH of 4. Beyond that range, there is a distinctly sharp drop in hardness, as will be evident from the results presented graphically in Figure 2 of the attached drawing, wherein hardness index is plotted against pH of preparation. It will be noted that with catalysts prepared at a pH in excess of 4, the hardness characteristics rapidly decline. It will further be seen that the catalysts exhibiting the greatest hardness are those prepared at a pH between 2 and 4, the optimum being a catalyst prepared at a pH of approximately 3.

It has previously been noted that intimate admixing of the raw kaolin and silica hydrogel may be accomplished by any of a variety of procedures to yield an active cracking catalyst, providing the pH of gelation is less than 4. In Table II set forth below, comparative results obtained utilizing differing methods for bringing about desired admixture of the raw kaolin and silica hydrogel are shown. In Example 1 described above, mixing was achieved by cogelation of a suspension of finely divided raw kaolin in sodium silicate. In Example 6, raw kaolin was digested with sodium silicate at a moderately elevated temperature, followed by gelation. More specifically, 360 grams of raw kaolin described above were heated for 16 hours at a temperature of 200° F. with 1400 c. c. of sodium silicate (0.213 gram $SiO_2$ and 0.067 gram $Na_2O$ per c. c.). The digested mixture of kaolin and sodium silicate so obtained was then gelled at a pH of about 0 and a temperature of 5 to 10° C. by the addition of 2,030 c. c. of 19N $H_2SO_4$. The resulting composite was water-washed, dried and calcined at 1050° F.

The comparative cracking data for each of these catalysts using the Cat–A method are tabulated below. The pH of gelation in each instance was approximately 0 and each of the resulting composites had a kaolin:silica ratio of about 1:1.

Table II

| Example | Hardness Index | Bulk density | Cat-A Results ||||| 
|---|---|---|---|---|---|---|---|
| | | | Gas Gravity | Gas, Percent Wt. | Coke, Percent Wt. | 300° F. E. P. Gasoline, Percent Vol. | Activity Index |
| 1 | 58 | 0.73 | 1.19 | 3.6 | 2.0 | 18.3 | 23.9 |
| 6 | 8 | 0.77 | 1.34 | 4.5 | 1.8 | 20.3 | 29.9 |

From the foregoing results, it will be noted that the two different methods of mixing kaolin and silica hydrogel yielded catalysts of satisfactory activity. Predigestion of the kaolin with sodium silicate prior to gelation yields catalysts of somewhat greater activity but the resulting products have a poorer degree of hardness than the catalysts prepared by cogelation techniques. It is accordingly preferred to prepare the instant catalysts by suspension of raw kaolin in an alkali metal silicate followed by gelation upon acidification thereof to a pH of less than 4.

As pointed out hereinabove, further improvement in catalytic properties of the present catalysts is achieved by a subsequent mild acid treatment. The effectiveness of this acid-activating treatment is further improved by preceding it with steam treatment. The influence of mild acid treatment and steam treatment on the hardness and activity of present catalysts is shown by the results of Examples 7 to 9 and Table III below.

EXAMPLE 7

One hundred thirty grams of the calcined catalyst of Example 1 were continuously extracted by circulating a 5% aqueous solution of $H_2SO_4$ at a rate of 250 c. c. per hour for 50 hours at room temperature (60–65° F.). The resulting product was then washed with water, dried, and finally calcined at a temperature of 1050° F.

EXAMPLE 8

One hundred thirty grams of the catalyst of Example 4 were acid-treated in accordance with the procedure of Example 7.

EXAMPLE 9

One hundred thirty grams of the calcined catalyst of Example 4 were subjected to a 10-hour treatment with 100% steam at 1200° F. and then continuously extracted with a 5% aqueous solution of $H_2SO_4$ at a rate of 250 c. c. per hour for 50 hours at room temperature (60–65° F.) The resulting product was then water-washed, dried, and calcined at a temperature of 1050° F.

The comparative cracking data for each of the above catalysts, together with those of the catalysts of Examples 1 and 4, are tabulated below:

Table III

| Example | pH | After Treatment | Hardness Index | Bulk Density | Cat-A Results |||||
|---|---|---|---|---|---|---|---|---|---|
| | | | | | Gas Gravity | Gas, Percent Wt. | Coke, Percent Wt. | 300° F. E. P. Gasoline, Percent Vol. | Activity Index |
| 1 | 0 | | 58 | 0.73 | 1.19 | 3.6 | 2.0 | 18.3 | 23.9 |
| 7 | 0 | [1] AT | 60 | 0.74 | 1.52 | 8.4 | 3.0 | 29.0 | 38.5 |
| 4 | 5.8 | | 0 | 0.47 | 1.11 | 1.4 | 0.6 | 6.5 | 12.9 |
| 8 | 5.8 | [1] AT | 0 | 0.44 | 1.26 | 1.9 | 0.7 | 14.2 | 21.6 |
| 9 | 5.8 | [2] ST+AT | 0 | 0.52 | 1.36 | 4.5 | 1.4 | 21.3 | 31.1 |

[1] Acid treatment: 50 hrs. with 5% $H_2SO_4$ at room temperature.
[2] Steam treatment: 10 hrs. at 1200° F. with 100% steam, followed by acid treatment, as above.

From the above tabulated results, it will be seen that both the activity and gasoline-to-coke ratio of the present catalysts can be substantially increased by mild acid treatment without prejudice to the hardness thereof. It will further be noted that the effectiveness of the acid treatment is improved by preceding it with a steam treatment.

We claim:

1. A method for producing a porous adsorptive catalytic material, which comprises intimately admixing raw kaolin in an amount corresponding to less than 50% by weight of the total solids in the subsequently dried product with silica hydrogel prepared at a gelation pH in the range of 2 to 4, and drying the composite so obtained.

2. In a process for producing a cracking catalyst from kaolin, the steps which comprise intimately admixing raw kaolin with silica hydrogel having a pH of between 2 and 4 in an amount such that the weight ratio of $SiO_2$ to $Al_2O_3$ in the resulting product is in the approximate range of 2.5:1 to 10:1, and drying the composite so obtained.

3. A method for making a porous adsorptive catalyst, which comprises intimately admixing raw kaolin in an amount corresponding to less than 50% by weight of the total solids in the subsequently dried product with an alkali metal silicate, acidifying the resulting mixture to a pH between 2 and 4, whereby a hydrogel is formed, and drying the resulting hydrogel.

4. A process for making a porous adsorptive catalyst, which comprises intimately admixing raw kaolin in an amount furnishing between about 10 and about 50% by weight of the total solids in the subsequently dried product with an alkali metal silicate, acidifying the resulting mixture to a pH of between 2 and 4, whereby a hydrogel is formed, washing, drying and calcining the resulting composite product, subjecting said composite product to mild treatment with mineral acid, and drying the resulting acid-treated composite product.

5. A process for producing a porous adsorptive catalytic material, which comprises intimately admixing raw kaolin in an amount corresponding to less than 50% by weight of the total solids in the subsequently dried product with silica hydrogel prepared at a gelation pH of between 2 and 4, washing, drying and calcining the resulting composite product, subjecting the resulting composite to mild treatment with dilute acid, and drying the resulting acid-treated composite.

6. A process for making a porous adsorptive catalyst, which comprises intimately admixing raw kaolin in an amount furnishing between about 20 and about 50% by weight of the total solids in the resulting dried product with an alkali metal silicate, acidifying the resulting mixture to a pH of about 3, whereby a hydrogel is formed, and drying the hydrogel so obtained.

References Cited in the file of this patent

UNITED STATES PATENTS

| | | |
|---|---|---|
| 2,259,485 | Plummer | Oct. 21, 1941 |
| 2,487,065 | Milliken | Nov. 8, 1944 |
| 2,454,942 | Pierce et al. | Nov. 30, 1948 |
| 2,474,868 | Shabaker | July 5, 1949 |
| 2,489,332 | Shabaker | Nov. 29, 1949 |
| 2,504,158 | Shabaker | Apr. 18, 1950 |